(12) United States Patent
D'souza et al.

(10) Patent No.: US 11,341,558 B2
(45) Date of Patent: May 24, 2022

(54) SYSTEMS AND METHODS FOR RECOMMENDING A PRODUCT BASED ON AN IMAGE OF A SCENE

(71) Applicant: SHOPIFY INC., Ottawa (CA)

(72) Inventors: Franklyn D'souza, Toronto (CA); Jonathan Wade, Ottawa (CA); Juho Mikko Haapoja, Toronto (CA)

(73) Assignee: SHOPIFY INC., Ottawa (CA)

( * ) Notice: Subject to any disclaimer, the term of this patent is extended or adjusted under 35 U.S.C. 154(b) by 361 days.

(21) Appl. No.: 16/690,380

(22) Filed: Nov. 21, 2019

(65) Prior Publication Data

US 2021/0158422 A1    May 27, 2021

(51) Int. Cl.
*G06Q 30/00* (2012.01)
*G06Q 30/06* (2012.01)
*G06N 20/00* (2019.01)
*G06F 16/583* (2019.01)

(52) U.S. Cl.
CPC ....... *G06Q 30/0631* (2013.01); *G06F 16/583* (2019.01); *G06N 20/00* (2019.01)

(58) Field of Classification Search
None
See application file for complete search history.

(56) References Cited

U.S. PATENT DOCUMENTS 11,126,845 B1 * 9/2021 Chaturvedi ............. G06T 11/60

OTHER PUBLICATIONS

Higgins, Michelle, "How Would That Couch Look at Home? Check Your Phone", The New York Times, published online on Oct. 3, 2017. Available from https://www.nytimes.com/2017/10/03/style/apps-for-decorating-rooms.html.
Brenner, Julia, "The 7 Best Apps For Planning a Room Layout & Design", Apartment Therapy, published online on Jun. 13, 2019. Available from from https://www.apartmenttherapy.com/the-7-best-apps-for-room-design-amp-room-layout-244213.
McAuley, Julian, et al. "Image-based Recommendations on Styles and Substitutes", Proceedings of the 38th International ACM SIGIR Conference on Research and Development in Information Retrieval, pp. 43-52, Aug. 9, 2015, Santiago, Chile. Available from https://cseweb.ucsd.edu/~jmcauley/pdfs/sigir15.pdf.
Kang, Wang-Cheng, et al. "Visually-Aware Fashion Recommendation and Design with Generative Image Models", Journal unknown. 10 pages, Nov. 7, 2017. Available from https://arxiv.org/pdf/1711.02231.pdf.

* cited by examiner

*Primary Examiner* — Mila Airapetian

(57) ABSTRACT

In some embodiments, a computer-implemented system within an e-commerce platform may receive and analyse digital images of scenes in order to generate a recommendation for one or more products offered for sale by a merchant. For example, a user may use their device to capture an image of a room that the user wishes to furnish, and the system may use a trained machine learning algorithm to recommend a product to be placed in the room. The recommended product may be superimposed on the image of the room.

20 Claims, 12 Drawing Sheets

| E-Commerce Platform | Q Search | JG John's Apparel / Jonny B. Good |

- ⌂ Home
- ↻ Orders
- ◈ Products
- ○○ Costumers
- ⫿⫿ Reports
- ⚙ Discounts
- ⊞ Apps SALES CHANNELS ⊕
- ⊛ Online Store
- ▯ Mobile App
- View all channels ⚙ Settings Good afternoon, Jonny B..

Here's what's happening with your store today.

Today's total sales    Today's visits
$98.00           1

● Update your Platform Payments tax details
We require additional information to verify your identity.
[Update tax details]

● Advanced Cash on Delivery has been deactivated for your store
[See why]

All channels ⌄    Today ⌄

TOTAL SALES
$98.00

$125
$75
$25
   12am   8pm   4pm   11pm
                                Jun 1
                             2 orders TOTAL SALES BY CHANNEL    View dashboard Online Store               Jun 1
$0.00                     0 orders Mobile app
$0.00                     0 orders Shopify POS (126 York St)
$0.00                     0 orders

FIG. 2

| Merchant ID | Product Name | Product Description (provided by Merchant) | Brightness of scene | Contrast in scene | Presence of red in scene | Presence of blue in scene | Tag: dining room | Tag: living room | Scene also includes candle sticks | Scene also includes cutlery | Etc. |
|---|---|---|---|---|---|---|---|---|---|---|---|
| 0035 | Vase | A dark red vase that is a great addition to any dining room table | 4/10 | 6/10 | 5/10 | 8/10 | Y | N | Y | Y | |
| 0035 | Couch | Set your living room ablaze with this bright orange couch | 8/10 | 9/10 | 4/10 | 3/10 | N | Y | N | N | |

| Scene ID | Product ID | Colour | Identifier | Height | Brightness | Contrast | Analysis Keywords | Merchant ID | Merchant Product ID | Merchant Copy Text |
|---|---|---|---|---|---|---|---|---|---|---|
| 101 | GEN | R207 G207 B207 | Wall | 1000 | 8/10 | 0/10 | Grey;matte; wall | N/A | N/A | N/A |
| 101 | 001 | R110 G023 B025 | Vase | 12 | 6/10 | 4/10 | Modern; Minimalist; Simple; Round; Rose; Tulip | 52794 | 3126 | Classical red vase. Modern and sleek. Perfect for living rooms and dining rooms. Best for roses and tulips. |
| 101 | 002 | R070 G186 B240 | Table | 29 | 2/10 | 5/10 | Pale;Sleek; Pastel; Leather;Low; Nautical | 10319 | 1284 | Super comfortable and sleek table. Spill proof and large. Everything you want for an apartment. |
| ⋮ | ⋮ | ⋮ | ⋮ | ⋮ | ⋮ | ⋮ | ⋮ | ⋮ | ⋮ | ⋮ |
| 102 | GEN | R207 G207 B207 | Wall | 1000 | 8/10 | 0/10 | Grey;matte; wall | N/A | N/A | N/A |
| 102 | 002 | R255 G227 B251 | Lamp | 12 | 9/10 | 1/10 | Industrial; bright; spherical; artistic; corded | 45432 | 0299 | Small lamp with dust cloth. Lightbulbs not included. Special one of a kind fixture. |

SYSTEMS AND METHODS FOR RECOMMENDING A PRODUCT BASED ON AN IMAGE OF A SCENE

FIELD

The present application relates to systems and methods of generating recommendations for products within an e-commerce platform.

BACKGROUND

An e-commerce platform can provide merchants with the ability to create online stores for buyers to view and purchase products for sale.

A buyer may wish to purchase one or more products for use in a particular space or area. For example, the buyer may be furnishing a room in their house and would like to purchase one or more products to fill that room. This may require a buyer to visit multiple merchant websites in order to view products available within an e-commerce platform for purchase. Further, the buyer may want a recommendation of what to buy. For example, the buyer may be unsure whether it would look better to have a couch against the wall or instead a love seat and side table against the wall. More generally, the buyer may have no idea as to what products could or would look aesthetically pleasing in their room.

Computer applications ("apps") currently exist that allow a user to capture a digital image of an area the user is wishing to furnish. The image may be transmitted to a human designer that reviews the image and makes recommendations of specific products based on the human designer's taste and knowledge of products.

An alternative computer-based method for recommending products is desired.

SUMMARY

In some embodiments, there is provided a computer-implemented system and method that allows users to provide digital images of scenes, which are analysed to generate a recommendation for one or more products offered for sale by a merchant. For example, a user may provide the system with an image of a room that the user wishes to furnish, and the system may use a trained machine learning algorithm to recommend a product to be placed in the room. The user may be shown the product and possibly offered the option to proceed to the online store of the merchant selling the product, e.g. so that the user can learn more about the product and possibly purchase the product.

According to some embodiments, a computer-implemented method is provided that includes storing a model that relates each merchant product of a plurality of merchant products to a respective set of scene visual property values. For each merchant product: each scene visual property value of the respective set of scene visual property values is indicative of a visual property of a scene that includes (or is associated with) the merchant product. The method may further include obtaining a digital image of a particular scene. The digital image was captured by a user device. The method may further include determining particular visual property values of the particular scene. The method may further include generating, using the model and the particular visual property values, a recommended merchant product.

A corresponding system for performing the disclosed methods is also provided. For example, the system may include a memory to store the model that relates each merchant product to its respective set of scene visual property values, and a processor to directly perform (or cause the system to perform) the method steps disclosed herein.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 7 is an example of a database of associations used by a recommendation engine in an e-commerce platform, according to one embodiment;

FIG. 8 is an example of a different database of associations used by a recommendation engine in an e-commerce platform, according to another embodiment;

DETAILED DESCRIPTION

For illustrative purposes, specific example embodiments will now be explained in greater detail below in conjunction with the figures.

Example e-commerce Platform

The methods disclosed herein may be performed in relation to an e-commerce platform. Therefore, an example of an e-commerce platform will be described.

Figure 1:
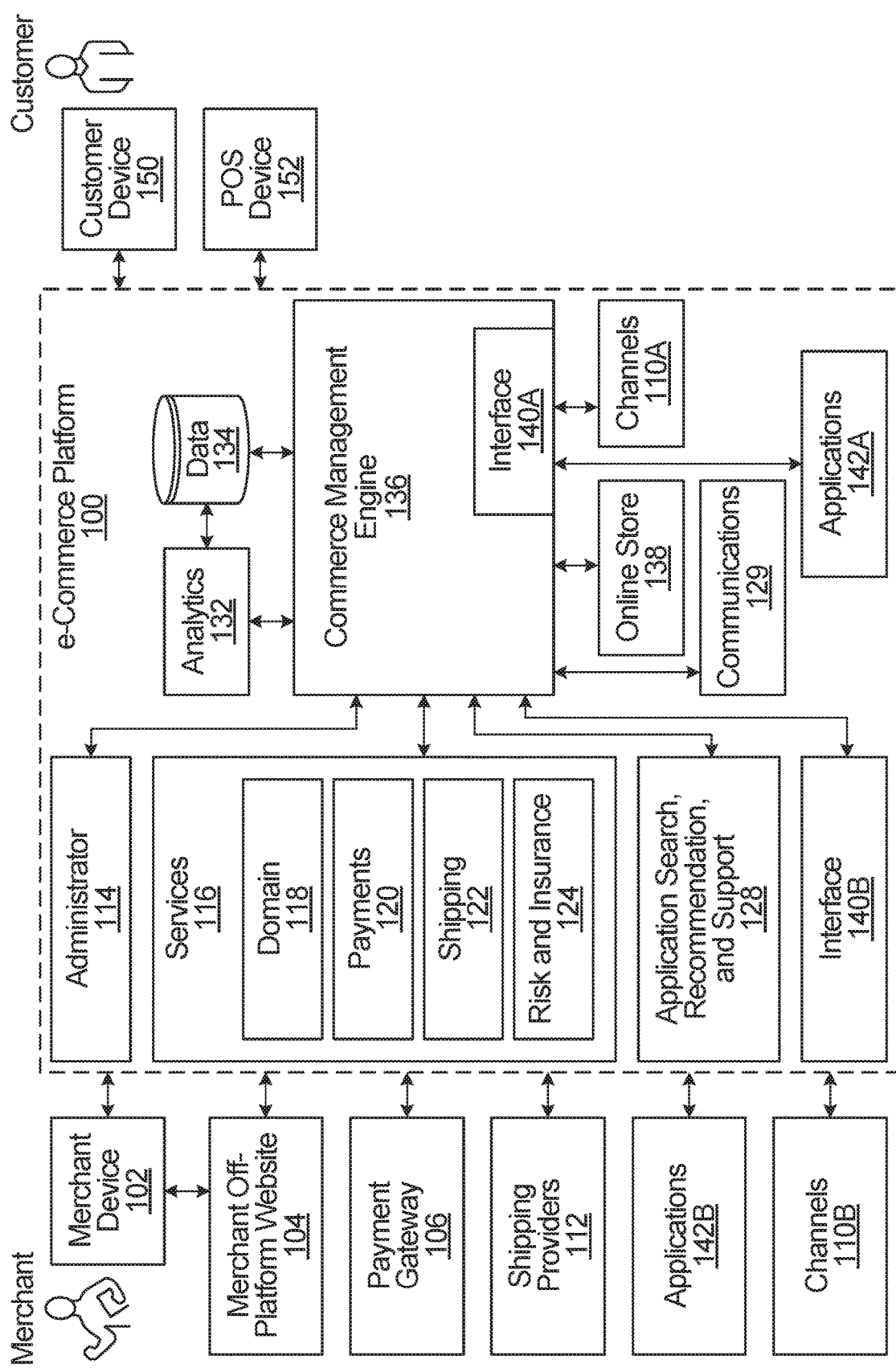
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multi-tenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Product Recommendations in an e-commerce Platform

In some embodiments, a computer-implemented system within e-commerce platform 100 may receive and analyse digital images of scenes in order to generate a recommendation for one or more products offered for sale by a merchant. For example, a customer may use their customer device 150 to capture an image of a room that the customer wishes to furnish, and the system may use a trained machine learning algorithm to recommend a product to be placed in the room.

Figure 3:
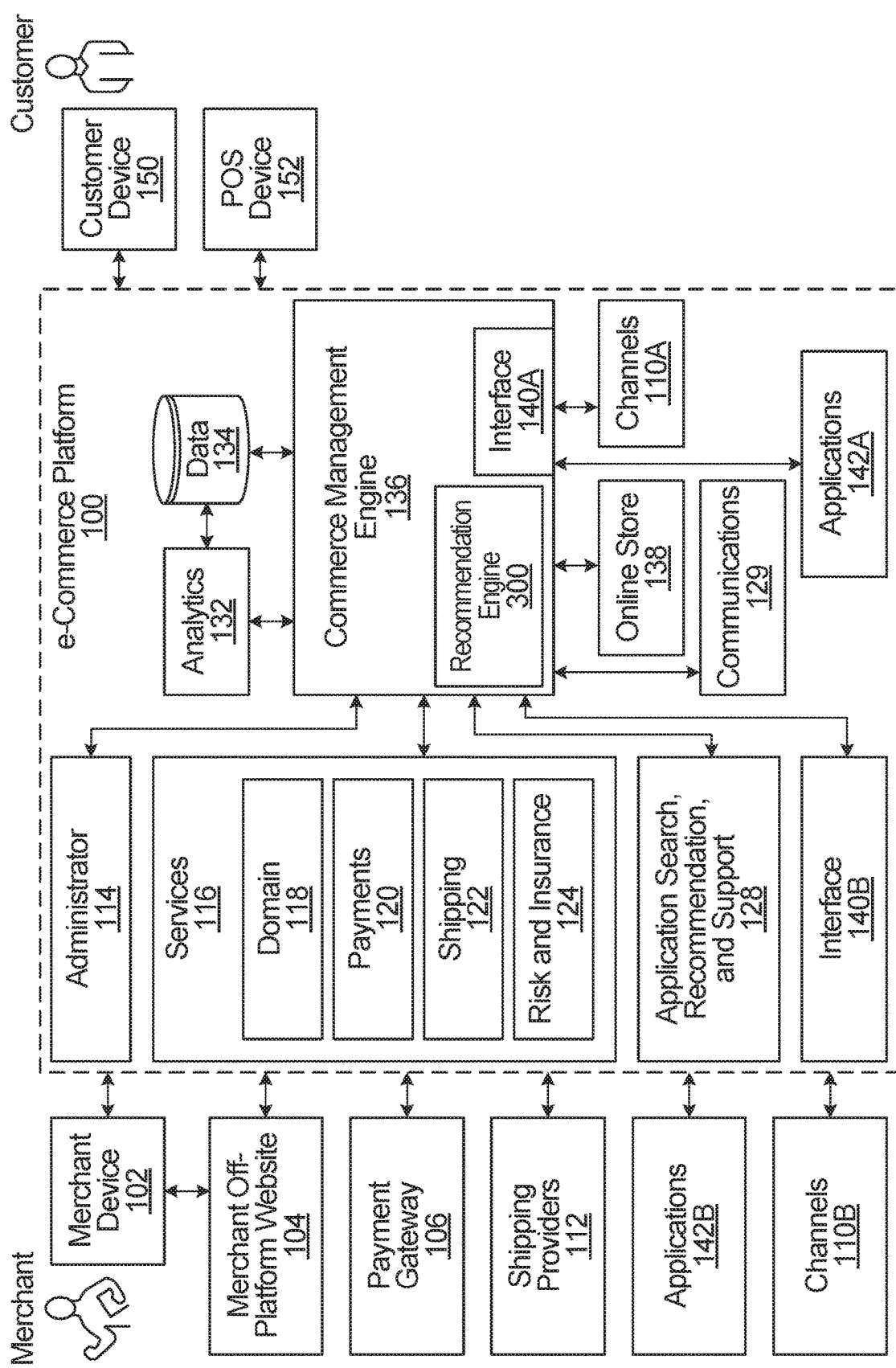
FIG. 3 is the e-commerce platform of FIG. 1, but including a recommendation engine.

In some embodiments, the e-commerce platform 100 may include a recommendation engine 300 to recommend merchant products to customers. An example of a recommendation engine 300 within an e-commerce platform 100 is illustrated in FIG. 3. According to this embodiment, the e-commerce management engine 136 includes the recommendation engine 300.

Recommendation engine 300 may be implemented by one or more processors that execute instructions stored in a memory. The instructions, when executed, cause the one or more processors to perform the operations of the recommendation engine 300. Alternatively, some or all of the recommendation engine 300 may be implemented using dedicated circuitry, such as an application specific integrated circuit (ASIC), a graphics processing unit (GPU), or a programmed field programmable gate array (FPGA).

According to some embodiments, the recommendation engine 300 is able to communicate with customers via a customer device 150 and with merchants via a merchant device 102. Further, the recommendation engine 300, within the commerce management engine 136, is able to interface with various components of the e-commerce platform 100 via interface 140A, such that the recommendation engine 300 may access data stored within or in association with the e-commerce platform 100, as well as initiate a purchase workflow for a user, e.g. that wishes to purchase a recommended product.

Although the embodiments described below may be implemented by recommendation engine 300 in e-commerce platform 100, the embodiments described below are not limited to the specific e-commerce platform 100 of FIGS. 1 to 3. Therefore, the embodiments below will be described more generally in relation to any e-commerce platform.

System Overview

Figure 4:
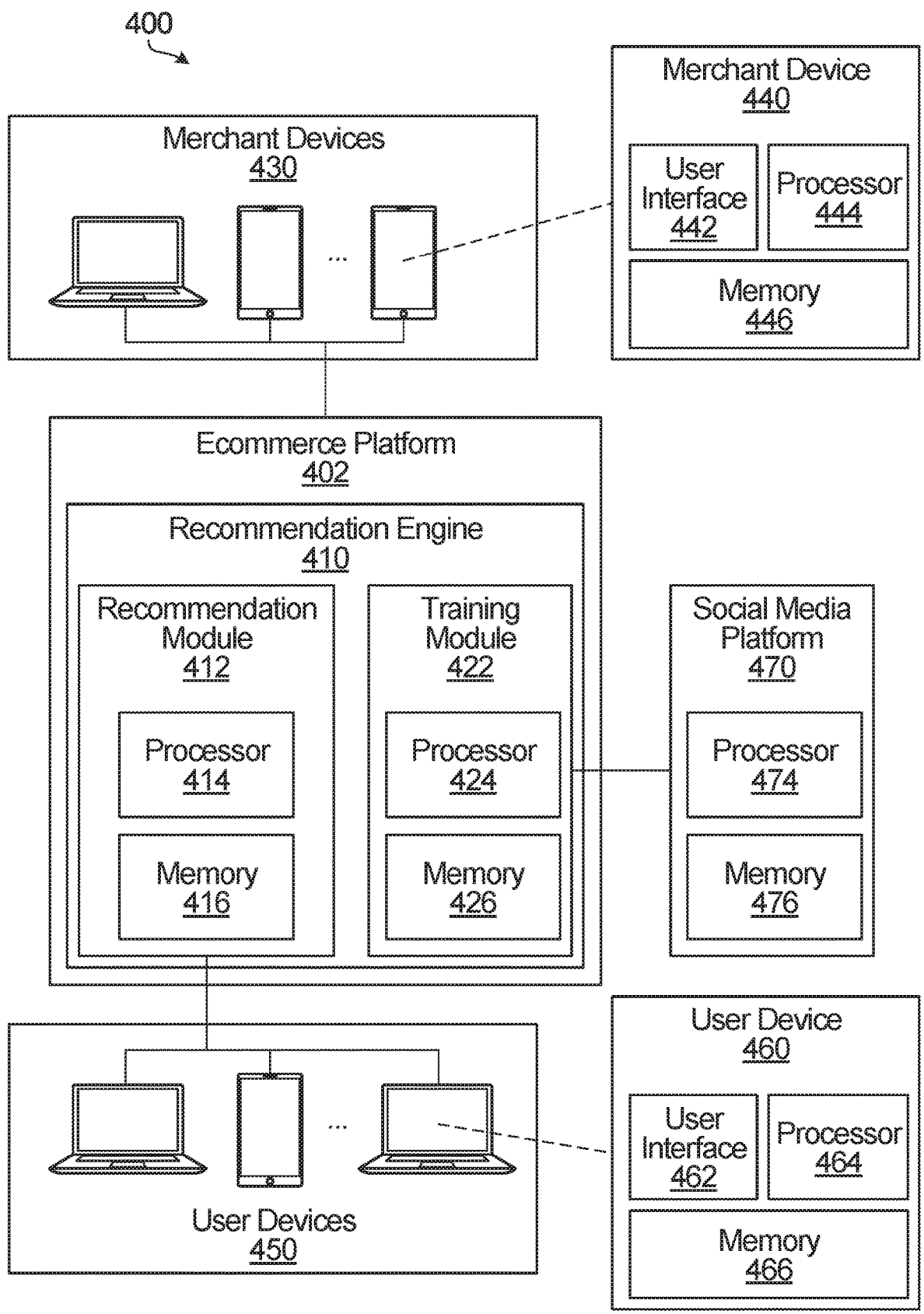
FIG. 4 is a system for recommending products, according to one embodiment.

FIG. 4 is a system 400 for providing product recommendations, according to one embodiment. The system 400 includes a recommendation engine 410 within an e-commerce platform 402. The components of the recommendation engine 410 are shown in greater detail in FIG. 4. The recommendation engine 410 and e-commerce platform 402 could be, but are not necessarily, the same recommendation engine and e-commerce platform as described in relation to FIG. 3.

In some embodiments, the recommendation engine 410 may be implemented by one or more processors that execute instructions stored in a memory. The instructions, when executed, cause the processor to perform the operations described herein, e.g. the operations relating to training a machine learning algorithm and subsequently making product recommendations to a user based on an image of a scene provided by a user. In other embodiments, the recommendation engine 410 may be implemented using dedicated circuitry, such as a programmed FPGA, a GPU, or an ASIC.

While figures may show memories and processors as separate entities, the different memories shown may actually be a single memory, and the different processors shown may actually be a single processor in implementation. Also, although not illustrated, the recommendation engine 410 may include or have access to a network interface that is part of the e-commerce platform 402, and that is for communicating over a network. The network interface may be implemented as a network interface card (NIC), and/or a computer port (e.g. a physical outlet to which a plug or cable connects), and/or a network socket, etc.

The recommendation engine 410 includes a recommendation module 412 that includes a recommendation engine processor 414 and a recommendation engine memory 416. Further, the recommendation engine 410 includes a training module 422 that includes a training module processor 424 and a training module memory 426. The processors, such as recommendation processor 414 and training module processor 424, may be implemented by one or more general purpose processors that execute instructions stored in memory (e.g. in memory 416 or 426). Alternatively, some or all of the processors, such as recommendation processor 414 and/or training module processor 424, may be implemented using dedicated circuitry, such as an FPGA, GPU, and/or an ASIC. Recommendation engine processor 414 is configured to perform the operations described herein that are performed by the recommendation module 412, e.g. receiving a digital image of a scene that was captured by a user device and generating a recommended merchant product. The training module processor 424 is configured to perform the operations described herein that are performed by the training module 422, e.g. generating a model to be used for making product recommendations.

In operation, the training module 422 generates and/or stores a model for extracting visual elements out of scenes to learn aesthetic patterns and styles. For example, the model may be generated by the processor 424 of the training module 422 obtaining merchant images and/or images from internal or external systems (e.g. from social media platforms, other on-line stores or marketplaces, image repositories, etc.) and analysing those images to determine scene visual property values that correspond to particular merchant products. Training module 422 may store and update a model for determining these patterns and styles, according to some embodiments. According to other embodiments, the training module 422 may generate the model itself from the beginning using a training algorithm.

Merchants can connect with the e-commerce platform 402 and thereby the recommendation engine 410 through the use of merchant devices 430. The merchant devices 430 could be, for example, mobile phones, tablets, laptops, personal computers, etc. These devices communicate over a network with the e-commerce platform 402. One of the merchant devices 430, which is labelled as merchant device 440, is shown in more detail in FIG. 4. A merchant device, such as merchant device 440 includes a user interface 442, processor 444, and a memory 446. The processor 444 is implemented as one or more processors configured to execute instructions stored in a memory (e.g. in memory 446). Alternatively, some or all of the processor 444 may be implemented using dedicated circuitry, such as an FPGA, GPU, or an ASIC. The processor 444 directly performs or instructs the merchant device 440 to perform the functions of the merchant device 440 explained herein. The user interface 442 may be implemented as a display screen (which may be a touch screen), and/or a keyboard, and/or a mouse, etc. Although not illustrated, the merchant device 440 further includes a network interface for communicating with the e-commerce platform 402 over a network. The structure of the network interface will depend on how the merchant device 440 interfaces with a network. For example, if the merchant device 440 is a mobile phone or tablet, the network interface may comprise a transmitter/receiver with an antenna to send and receive wireless transmissions to/from the network. If the merchant device 440 is a personal computer connected to the network with a network cable, the network interface may comprise a network interface card (NIC), and/or a computer port (e.g. a physical outlet to which a plug or cable connects), and/or a network socket, etc.

Users can also connect with the e-commerce platform 402 and thereby the recommendation engine 410 through the use of user devices 450. A user is a buyer, customer, potential customer, or anyone interested in providing a digital image of a scene to the recommendation engine 410 to receive a recommendation for one or more merchant products based on the scene. In general, a user could also be a merchant, in which case a user device may also be a merchant device.

The user devices 450 could be, for example, mobile phones, tablets, laptops, personal computers, etc. These devices communicate over a network with the e-commerce platform 402. One of the user devices 450, which is labelled as user device 460, is shown in more detail in FIG. 4. A user device, such as user device 460 includes a user interface 462, processor 464, and a memory 466. The processor 464 is implemented as one or more processors configured to execute instructions stored in a memory (e.g. in memory 466). Alternatively, some or all of the processor 464 may be implemented using dedicated circuitry, such as an FPGA, GPU, or an ASIC. The processor 464 directly performs or instructs the user device 460 to perform the functions of the user device 460 explained herein. The user interface 462 may be implemented as a display screen (which may be a touch screen), and/or a keyboard, and/or a mouse, etc. Although not illustrated, the user device 460 further includes a network interface for communicating with the e-commerce platform 402 over a network. The structure of the network interface will depend on how the user device 460 interfaces with a network. For example, if the user device 460 is a mobile phone or tablet, the network interface may comprise a transmitter/receiver with an antenna to send and receive wireless transmissions to/from the network. If the user device 460 is a personal computer connected to the network with a network cable, the network interface may comprise a network interface card (NIC), and/or a computer port (e.g. a physical outlet to which a plug or cable connects), and/or a network socket, etc.

In operation, a user uses their user device 460 to capture and transmit to the recommendation engine 410 a digital image (e.g. a picture or a frame of a video) of a scene having visual elements. The visual elements of the scene have particular visual property values (e.g. brightness, presences of certain colors or objects, etc.). The user may also transmit to the recommendation engine 410 additional information about or relating to the scene (e.g. identify the scene being captured, e.g. "bedroom", "back deck", "table", etc., and/or identify objects in the scene, time of day, etc.). The recommendation module 412 determines the particular visual property values of the particular scene and uses a stored model that is created and/or maintained by the training module 422 to recommend a merchant product. The recommendation is returned to the user device 440. The recommendation module 412 may instruct the user device 440 to display a digital image of the recommended product at the user interface 462 of the user device 440, e.g. by instructing the recommended product to be superimposed on the digital image of the scene and displayed on the user device 460 so that the user can see what the recommended product would look like in the scene.

According to some embodiments, the e-commerce platform 402 can communicate with a social media platform 470, e.g. over a network, to receive images from the social media platform 470 that may be used for training to create and/or update the model, as explained below. Examples of social media platforms include Facebook™, Pinterest™, and Instagram™. The social media platform 470 includes a processor 474 and memory 476, which may be part of a server. The processor 474 is implemented as one or more processors configured to execute instructions stored in a memory (e.g. in memory 476). Alternatively, some or all of the processor 474 may be implemented using dedicated circuitry, such as an FPGA, GPU, or an ASIC. The processor 474 directly performs or instructs the social media platform 470 to perform the operations of the social media platform 470 described herein (e.g. retrieve and send images to the recommendation engine 410). The memory 476 stores instructions and files related to the social network operation. Also, although not shown, the social media platform 470 includes a network interface for communicating with the e-commerce platform 402 over a network. The network interface may be implemented as a network interface card (NIC), and/or a computer port (e.g. a physical outlet to which a plug or cable connects), and/or a network socket, etc. In operation, the recommendation engine 410 may generate requests, for example application program interface (API) requests, to the social media platform 470 for access to specific commands operable by the social media platform processor 474 and files in the social media memory 476. For example, the training module 422 may send an API request to the social media platform 470 requesting that the social media platform 470 return images that are stored on the social media platform 470. The images may be used for training to improve the model.

Operation of embodiments will now be described, beginning with generation of a model by training, and followed by use of the model post-training to recommend merchant products.

Training the System

The purpose of the training module 422 is to generate or store a model that may learn aesthetic patterns and styles, and associate those patterns and/or styles with particular merchant products. In some embodiments, the model is generated in the form of a table of associations that link merchant products with scenes having particular visual properties. The recommendation engine 410 may then use the model to provide a user with a recommendation for a product for their specific scene.

According to some embodiments, the recommendation engine 410 may be implemented using a machine-learning based algorithm, such as a neural network. Neural networks can be first taught how to identify parameters in a training mode. Training modes may be generally categorized as unsupervised and supervised learning modes. According to some embodiments, training takes place using training module 422 by training module processor 424 with access to training module memory 426, which may include in memory instructions for how to operate the training mode, along with the input set of training data.

According to some embodiments, the model is generated using a supervised learning mode. In a supervised learning mode, training of the system is done by analyzing a given set of values, making quantitative comparisons, and cross-referencing conclusions with a known result. Iterative refinement of these analyses and comparisons allows an algorithm to achieve greater certainty between the predicted outcome and the known result. This process is continued iteratively until the solution converges or reaches a desired accuracy.

According to other embodiments, the model is generated using an unsupervised learning mode. In an unsupervised learning mode, a system is able to determine and draw its own connections from a training data set. This can be done by looking into naturally occurring data relationships or patterns in data. One method of implementing an unsupervised learning model is cluster analysis, wherein the system's goal in training is to discover groups within the set of data. In cluster analysis, the system will subdivide the full data set to determine groups that have high intra-group similarities and low inter-group similarities. As a simple example, the cluster analysis may determine that certain product types, like vases, are associated with pictures having bright lighting conditions and a lot of the blue in the background.

In both a supervised and unsupervised training system, a large amount of input data may be used to reach a level of confidence in the use of the system for its intended purpose. Input data, for example, could be photos of views in furnished rooms, also called scenes. The term "scenes" will be used herein, and is meant to include any sort of scene that may be captured in a digital image (e.g. a room, a back deck, a table, etc.).

According to other embodiments, the model may be generated without the use of a machine learning algorithm. For example, merchants may identify to the training module specific products, and associated types of scenes (either freeform or from a prepopulated list of types of scenes). The model may then be generated as a table (or the like) in memory that associates each merchant product with one or more scenes, e.g. through the use of tags. For example, the merchant product "Vase" may be associated with the scenes "living room" and "dining room" based on an explicit indication by the merchant that their Vase is contemplated for use in a living room or dining room. Post-training, the user wanting a product recommendation may identify the type of scene or select the scene from a prepopulated list of types of scenes (for example, a "living room"), or image analysis may be used to categorize the user's picture as a particular type of scene. The model may then operate to select a recommended product corresponding to that scene based on the association/tags. As another example, the model may be generated by merchants identifying specific products in specific scene images, and the system extracting and calculating visual property values of the scenes, such as contrast per pixel, RGB breakdown, etc. Other visual property values may describe saturation, percentage whitespace or blackspace, etc. For example, a merchant may provide the specific products and an image of their merchant product within a scene, and the model may be generated by the system extracting the calculated values of the properties of that scene and storing those properties in association with the merchant products identified to be in the scene (e.g. the scene has a certain contrast per pixel and certain color breakdown).

In some embodiments, input data for constructing the model can be generated using scenes already uploaded and stored in the e-commerce platform 402, for example, photos of staged scenes including merchant products that are in product pages for marketing purposes. Alternatively or additionally, the recommendation engine 410 can allow merchants to upload and provide scenes to the training module 422 so that they can be used for training purposes. According to some embodiments, scenes used for training are stored in training module memory 426.

Figure 5:
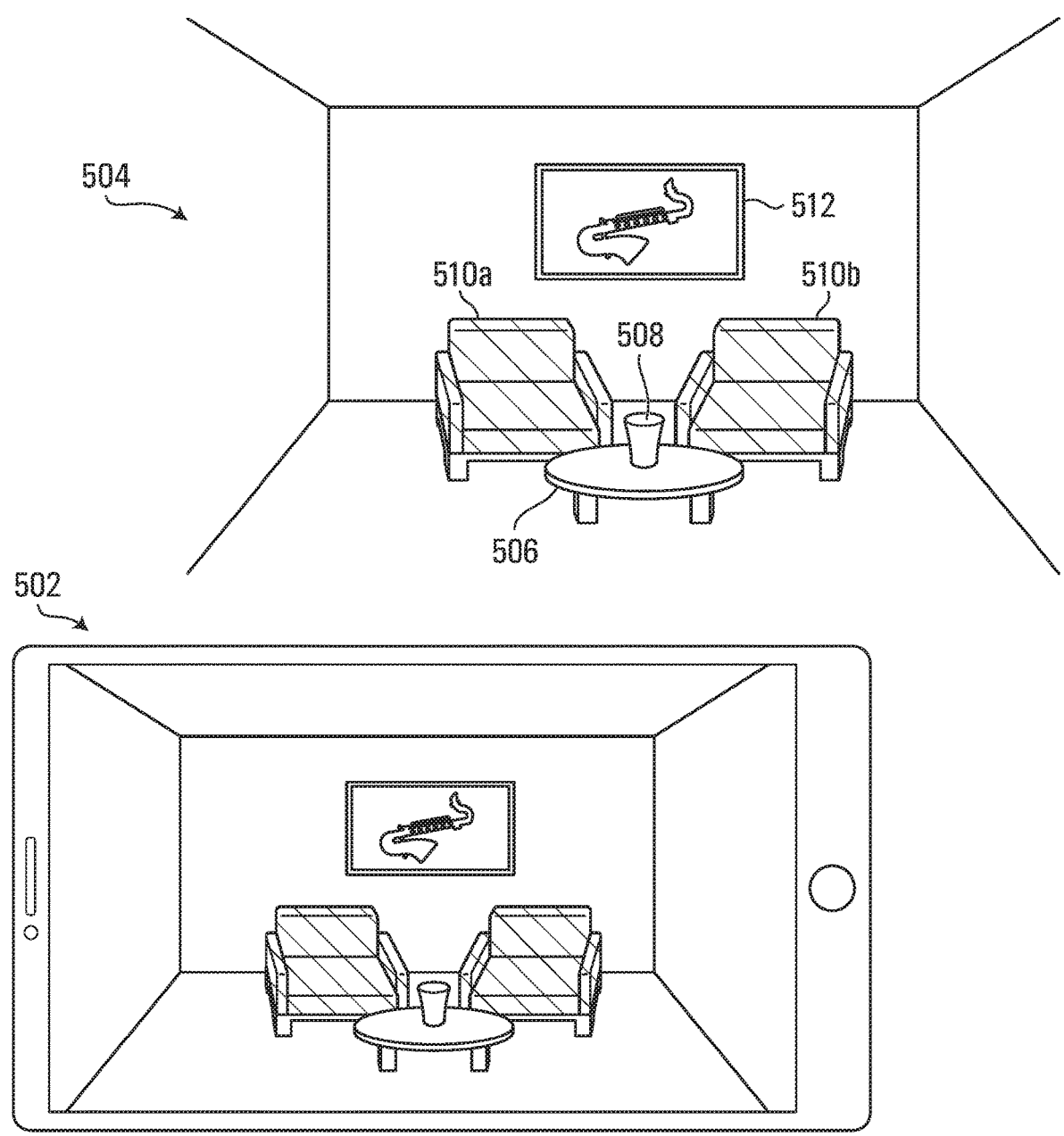
FIG. 5 is a diagram showing an example of a merchant electronic device capturing a digital image of a product set within a scene.

Merchants may upload data to train the recommendation engine 410 by uploading scenes, e.g. as shown in in FIG. 5. According to one embodiment, in operation, a merchant uses their merchant device 502 (which may be merchant device 440) to capture a digital image of a scene 504. The scene 504 contains products. Examples of products in the scene 504 are the table 506, vase 508, chairs 510a and 510b, and painting 512. Products may be specific products available to purchase from the merchants through the e-commerce platform 402. For example, vase 508 may be a product sold by the merchant using the e-commerce platform 402, and the purpose of the scene 504 may be to showcase the vase 508 in a scene in which the merchant believes is aesthetically pleasing.

Figure 6:
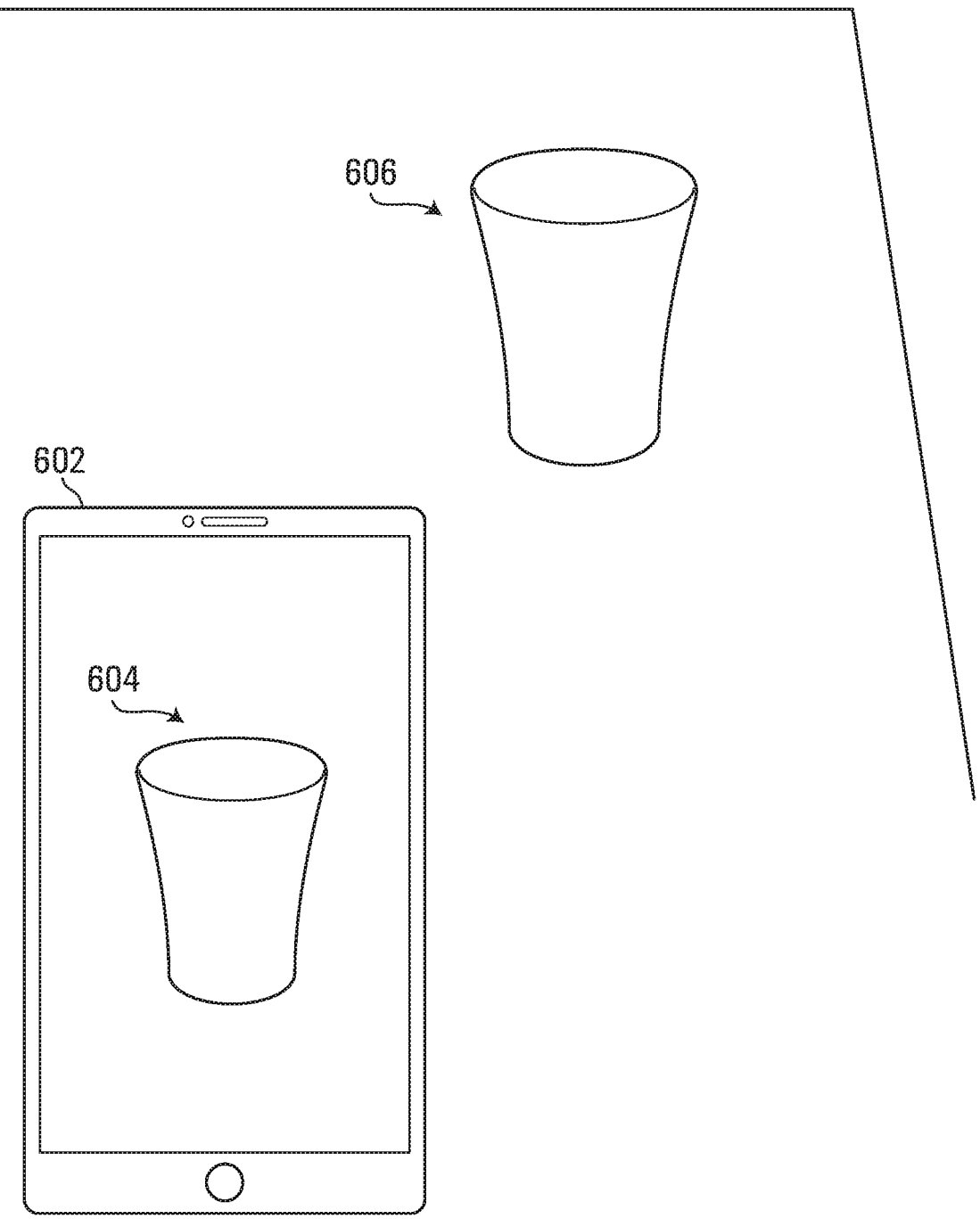
FIG. 6 is a diagram showing an example of a merchant electronic device capturing a digital image of the product not set within a scene.

According to some embodiments, training data may also include photos of individual products that are for sale by the merchant, such as products on a white background. Similar to scene data, product data may be photos of products already uploaded and stored in the e-commerce platform 402. Merchants can upload images of products to the e-commerce platform 402 using their merchant device, as shown in FIG. 6. FIG. 6 includes a product 606 (in this case a vase) that has its image 604 captured using a camera on the merchant device 602. The merchant device may be merchant device 440. In operation, this can be done by taking a photo or video of the product 606 to create a digital image, and the merchant device 602 transmitting the digital image over a network to the training module memory 426.

According to some embodiments, the training data may include text data about or relating to the scenes and/or products. For example, the merchants may include titles for their scenes or products, e.g. "Vase in living room". Further, merchants may include descriptions or specifications about their products. For example, the merchant may have included some advertising copy within the e-commerce platform 402 about the product, or measurements such as height, width, depth, and/or weight of a product, e.g. "A dark red vase that is 12 inches tall and two pounds".

According to some embodiments, training data may be sourced from a social media platform, such as social media platform 470. The data sourced from a social media platform may include specific product data and/or general aesthetic data. Specific product data is data that has been identified to include a product available from a merchant on the e-commerce platform 402. General aesthetic data is data that includes products within scenes and may be helpful in determining trends, however, may not include a product available from a merchant on the e-commerce platform 402. Data may be generated from external sources (e.g. from social media platforms) by making requests to their servers for information that is stored on their memory. These requests may be processed by a processor in a server of an external data source. The server can contain a memory containing photos of scenes. In response to this request, the processor may generate locations of images that correspond to the request.

For example, a data source may be a social media platform such as Pinterest™ or Instagram™. The training module 422 may query the data source for a specific type of scene, for example "dining room". The query may be more detailed or centric to a product, for example, "blue modern dining room", or "champagne flutes for modern dining room". The specific query text may be sourced from a database of prepopulated queries and keywords, or alternatively generated by the training module 422 on its own. In response to the query, a processor on a server for the external data source may return a listing of images that match the request from the training module 422. Data retrieved may also include additional information beyond an image of a scene. For example, the social media platform may also contain associated data, such as a link for purchasing a product. This information may be utilized in system analysis.

A machine learning algorithm may be employed by the training module 422 to analyse scenes to find patterns within data. By employing a machine learning algorithm, there is potential to explore deeper relationships compared to a human analysis. The training module 422 may be able to recognize not only what products look nice next to each other (for example, from a colors standpoint), but also what objects have been recognized to "go together" (for example, champagne flutes and candlesticks).

In some embodiment that utilize a supervised learning environment, the training module 422 may use an initial data set provided by merchants that includes scenes without a specific product, and the specific product that the merchant thinks should be recommended to the scene to make the scene more aesthetically pleasing. The training module 422 may then analyse the input scenes in order to determine the elements within the scenes that could indicate that the specific product should be recommended.

In some embodiments that utilize an unsupervised learning environment, the training module 422 may use an initial training data set to create predictive assumptions (e.g. rules for the training module 422 to use to determine whether a scene may be considered aesthetically pleasing). This decision may require a calculation that is more complicated than visual similarity, as it includes notional relationships between objects or products. For example, products in scenes may be grouped together and associated with particular labels, e.g. "funky" based on scenes described as "funky blue dining room", "funky times with my friends in the backyard", etc.

Regardless of the training algorithm or approach taken, the goal in training is to produce a model that relates each merchant product to a corresponding set of scene visual properties. According to some embodiments, the model is in the form of a table (or the like). The corresponding set of scene visual properties are determined and assigned scores (values) by learning the visual properties of scenes that include a product. According to other embodiments, the model may comprise the structure of a deep learning environment, including the layers of hidden nodes and individual weighting factors assigned to individual nodes within the system.

According to some embodiments, the model generated and stored within the system may take the form of a table of associations structured in the form shown in FIG. 7. This table 700 has been populated with example data for illustrative purposes. According to this embodiment, each product 704 has been identified by the system with its own row in a table. Each product 704 relates to a particular merchant 702 in the e-commerce platform 402. The table further includes a product description 706 (when provided by the merchant) and extracted visual properties 708 that are associated with each merchant product 704. Some examples of visual properties 708 include brightness, contrast, color breakdown, etc. Visual properties 708 associated with a merchant product may also include tags associating the scene information with certain descriptions or other objects, such as whether the scene has been tagged as pertaining to a specific type of room, or if there are other products 704 within the scene.

When the merchant uploads a picture of their product in a scene for training, the picture is analyzed to determine a set of visual properties 708 of the scene. A score (value) is assigned to each visual property of the scene. In some embodiments, the product may first be removed from the scene (using image processing) before the analysis occurs. There are some visual properties that are universal, e.g. "brightness of scene". There are other visual properties that may be discovered just for a particular product, e.g. tag: 'modern finish' based on a product description from the merchant.

Multiple images of the product in different scenes are used to refine and/or weight the set of scene visual property values associated with the product, or to add a new scene visual property for the product. For example: A merchant sells the product 'Vase'. The first picture of 'Vase' uploaded by the merchant shows the Vase in a room with low lighting, and so the scene brightness score is assigned 3 out of 10. The second picture of 'Vase' uploaded by the merchant shows the Vase in a room that is a little brighter, and so the scene brightness score is adjusted, e.g. increased to 4 out of 10.

Social media images may also be used for training. In one embodiment, when images are received from a social media platform, each image can be linked by the training module 422 to at least one merchant product. For example, a particular image is received from Pinterest™ that can be associated with the product 'Vase'. That picture is then used by the training module 422 to modify the scene visual property values associated with the 'Vase' product. For example, if the picture from Pinterest™ has a lot of contrast, then the contrast score is increased by the training module 422 for the 'Vase' product. A weighting may be used to assign the Pinterest™ pictures a different (greater or lesser) influence on the overall visual property values compared to pictures supplied by the merchant.

According to other embodiments, as shown in FIG. 8, the recommendation engine 410 may be able to store a model including another structure of table, such as the table 800. This table 800 has been populated with example data for illustrative purposes. The table 800 includes a scene ID 802, a product ID 804, a color breakdown 806, an identifier 808, visual elements 810, analysis keywords 812, a merchant ID 814, merchant product ID 816, and merchant copy text 818. This model may contain additional information as would be known to be necessary for operation by a person skilled.

Scene IDs 802 are used to identify each individual scene uploaded within the training set to the data. Within each scene ID 802, the training module 422 is able to identify and separate individual products, and will assign a product ID 804. An individual Product ID 804 relates each specific product identified by the training algorithm to be within the scene. The training module 422 may also identify features relating to the general layout of the scene, such as the wall of a scene. For example, in scene ID "101", the scene includes product IDs 804 for a wall, vase, and table. Each individual row entry for each scene relates to either a general property (such as the wall) or an individual Product ID 804.

The training module 422 may also identify color breakdown 806 for each sub-product within the scene. For example, the training module 422 is able to determine that in scene "101", product "001" has a color breakdown of (110,023,025) on an RGB scale.

Based on image analysis and comparison, merchant input, or another analysis method known, an identifier 808 for the title of the product "001" within scene "101" is a "vase".

The table 800 may also include a set of visual properties 810 of the product or scene. A score (value) can be assigned to each visual property of the scene using the same or a similar method as described previously. For example, the product 001 within scene 101 ("Vase") has been assigned brightness score of 6/10.

Keywords 812 may be extracted for each product within the scene. These keywords may be extracted from the merchant text 818, or through an image analytics engine trained to recognize keywords within images. For example, for the "vase", the system has generated six keywords (i.e. "modern", "minimalist", "simple", "round", "rose", and "tulip").

For each individual merchant product, the table 800 or table 700 can include information about how or where within the e-commerce platform 402 the individual product can be purchased, e.g. a link to an online store of the merchant selling the merchant's product. This is done by storing, for each product, a merchant ID 814 and a merchant product ID 816. As multiple products within a single scene may be available from different merchants, this information can be used to direct the user to the appropriate merchant store within the e-commerce platform 402 for purchasing the product.

Use of the System Post-Training

Once the model has been generated, it may be used by the recommendation module 412 to recommend one or more merchant products based on scene images provided by users.

Figure 9:
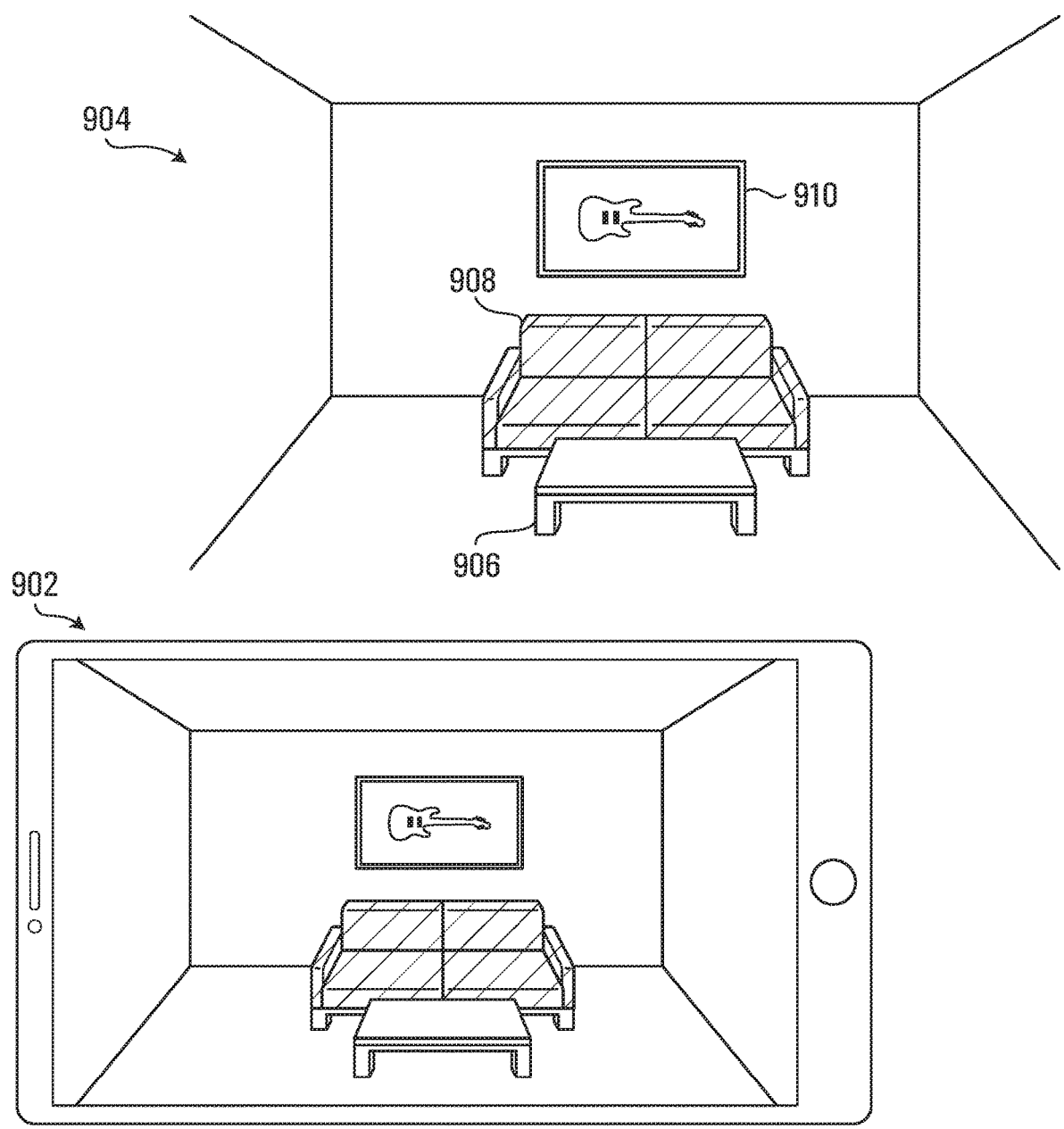
FIG. 9 is a diagram showing an example of user electronic device capturing a digital image of a scene for submission to a recommendation engine.

FIG. 9 shows an example of a user using their user device 902 (which may be user device 460) to capture a digital image of a scene 904, which is transmitted to the recommendation module 412. The scene 902 includes a number of objects, namely a coffee table 906, a couch 908 and a painting 910. When the recommendation module 412 receives the digital image of the scene 904, visual property values are extracted from that scene, along with any related data (e.g. the user indicates the scene is of their living room, and so the tag 'living room' is also extracted).

The system then compares the extracted visual properties from the scene to the model (e.g. the table of associations in FIG. 7 or FIG. 8), and identifies a merchant product in the model that best matches or corresponds to the user-uploaded scene. An identification of the recommended merchant product is transmitted by the recommendation module 412 back to the user device 902 over the network. For example, an image of the recommended product, a website link to the recommended product, and data related to the recommended product (e.g. the price of the recommended product) may be transmitted to the user device 902.

According to some embodiments, the recommendation module 412 may categorize the user scene 904, e.g. by using the extracted visual properties of the user scene 904 to match the user scene 904 to one of the scene types identified during training. Once the user scene 904 is matched to its closest scene type, a merchant product associated with that scene type is recommended. For example, a user may upload a picture of a dining room. The algorithm categorizes the picture as scene type "blue modern dining room". From the training, the 'Vase' product sold by merchant has been associated with the scene-type "blue modern dining room". Therefore, the 'Vase' product is recommended to the user.

Figure 10:
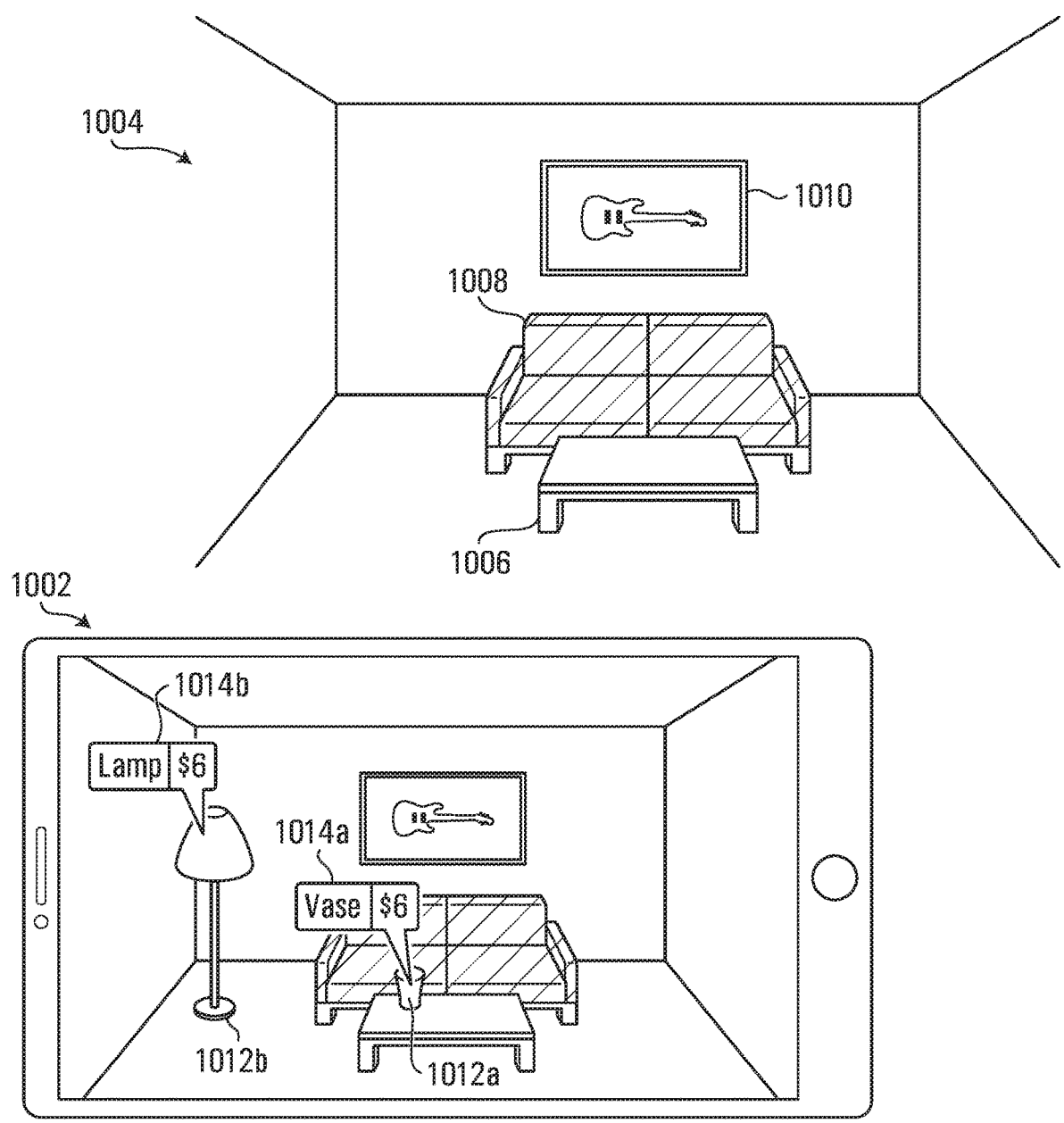
FIG. 10 is a diagram showing an example of an analysed image of a scene in which recommended products are shown on an electronic device of the user.

According to some embodiments, the user device 902 may superimpose or otherwise add photos or 3D models of the one or more recommendation products into the scene image, e.g. to create an Augmented Reality (AR) model. An example is shown in FIG. 10. The scene 1004 in FIG. 10 contains a table 1006, couch 1008, and painting 1010, but the image shown on user device 1002 includes a superimposed image of each generated recommended product 1012a and 1012b, namely a vase and lamp respectively. According to some embodiments, the generated recommended products 1012a and 1012b may also have tooltips 1014a and 1014b that, when displayed, indicate information about the recommended products, for example a title and price. A user may use their user device 1002 to select the tooltips in order to direct the user to the merchant's store in the e-commerce platform 402 where the user could learn more about the product and/or purchase the product.

Figure 11:
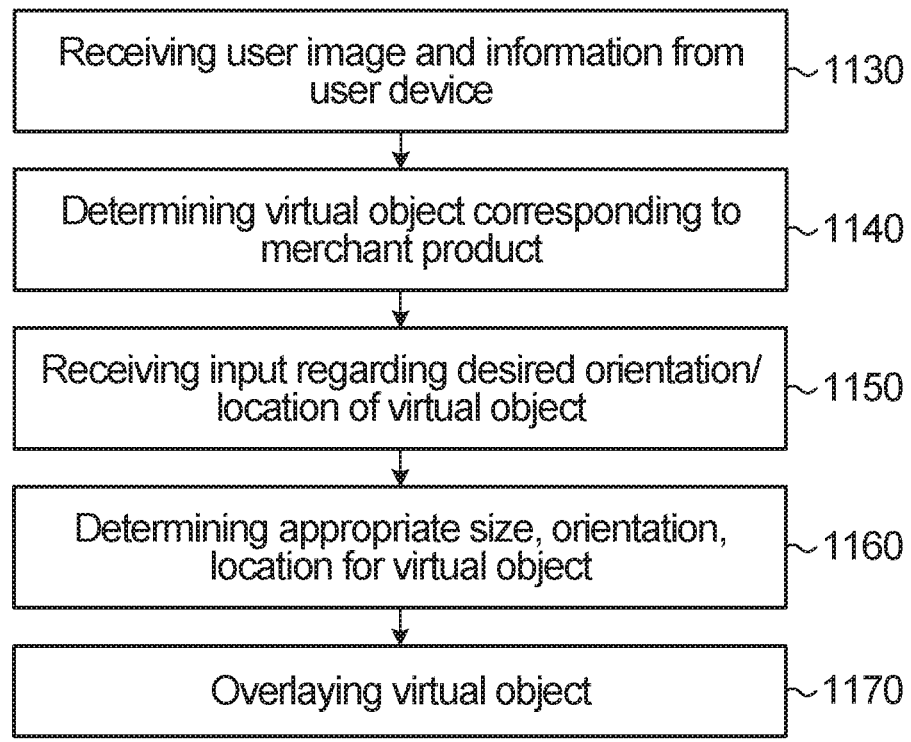
FIG. 11 is an example process for superimposing a digital image of a recommended merchant product onto a digital image of a user scene.

FIG. 11 is one embodiment of an example process 1100 for superimposing a digital image of a recommended merchant product onto a digital image of a user scene. In FIG. 11, the digital image of the recommended merchant product will be referred to as a virtual object. The method of FIG. 11 may be performed at the user device 1002, e.g. based on instructions from the recommendation engine 410 (e.g. the recommendation engine 410 may transmit the virtual object of the merchant product to the user device and indicate that the user device is to perform the superposition). Alternatively, the recommendation engine 410 itself may perform the method of FIG. 11, e.g. the user's image of the scene may be transmitted to the recommendation engine 410, which then performs the method of FIG. 11 to generate the superposition, and the resulting image having the superimposed merchant product(s) may then be transmitted back to the user device for display on the user interface of the user device. Therefore, the method of FIG. 11 will be described as being performed by a system, which may be the user device (e.g. the processor of the user device) or the e-commerce platform (e.g. a processor of the recommendation engine), or some combination of the two.

At step 1130, the system receives a user-supplied image of a scene. The user-supplied image may originate from a camera of the user's device. The user-supplied image depicts an environment. According to some embodiments, the image received from the user device may be one of a series of images in the form of frames of a live or recorded video captured by a user device. Data regarding at least one dimension depicted in the environment may also be obtained (e.g. such as a dimension of the size of a coffee table), or the system may calculate a dimension based on the size of a product selected (e.g. the system estimates the width dimension of the coffee table). In some embodiments, the system calculates the height and depth dimensions, e.g. based on a reference object or properties of the camera capturing the scene image. The system may also receive information regarding an initial desired placement of the merchant product or may determine an initial placement based of the type of merchant product and an object recognition algorithm operating on one or more received images (e.g., placing a vase in the centre of a coffee table, unless there is an object considered by the system to obstruct virtual object placement).

At step 1140, a virtual object corresponding to the merchant product is retrieved or created. For example, 3D models corresponding to merchant products may be stored in a library in the e-commerce platform (or elsewhere) or multiple 2D images of the product from various perspectives may be retrieved and manipulated to create an appropriate virtual object in known ways.

At a step 1150, the system may receive a positioning signal, such as from the user device or from the e-commerce platform or originating from the merchant computing device. The positioning signal is indicative of a desired positioning of the virtual object or a component part of the virtual object in the user's environment, as represented in at least the user supplied image.

At a step 1160, the system operates to determine an appropriate size, orientation, and/or position of the virtual object with respect to one or more determined locations depicted in the user-supplied image. This may occur by a user interacting with their user device to indicate how the user would prefer the rendered virtual object to appear within the scene. For example, a user may desire a virtual object Vase to be moved from a near side of a coffee table to a far side of the coffee table. The user would interact with a touch screen on the electronic device, by dragging a virtual object further into an image background. The system would receive input signals from the touch screen, analyse the touch screen input signal, and modify and update the size, location, and orientation at which the virtual object is positioned or oriented.

At a step 1170, an augmented one or more images may be created in real time by overlaying the virtual object or a component part of the virtual object at a determined location, or a delta may be determined corresponding to amounts the virtual object should be moved in one or more dimensions with respect to a previous location and/or orientation. New size information of the virtual object could also be provided. In some embodiments, depending upon the implementation, the delta information and/or additional sizing information can be communicated to the user device, and the virtual object adjusted accordingly in displayed image frames at the user device.

According to some embodiments, the recommendation engine 410 may be able to adapt to user selections in order to improve generated recommendations. For example, if the user indicates that he or she likes a recommended product (e.g. purchases the recommended product or clicks on a website link to the recommended product), then this may act as a form of validation of the association between the recommended product and the set of scene visual property values associated with the recommended product. This may increase the probability that the recommended product is also recommended to other user-uploaded scenes having similar scene visual properties. The user feedback may also be used to adapt the value of one or more scene visual properties associated with the recommended product. As another example, if the recommended product was liked by a user in a user-uploaded image having bright lighting conditions, then the weighting associating the recommended product with bright lighting may be increased. The algorithm will then more likely recommend the same product to other users uploading images of scenes having bright lighting conditions. The user feedback may also influence the future recommendations provided to that particular user. For example, if a user likes a recommended product in an image that has high contrast, then the system may more likely recommend other products that are associated scenes having high contrast.

General Methods

Figure 12:
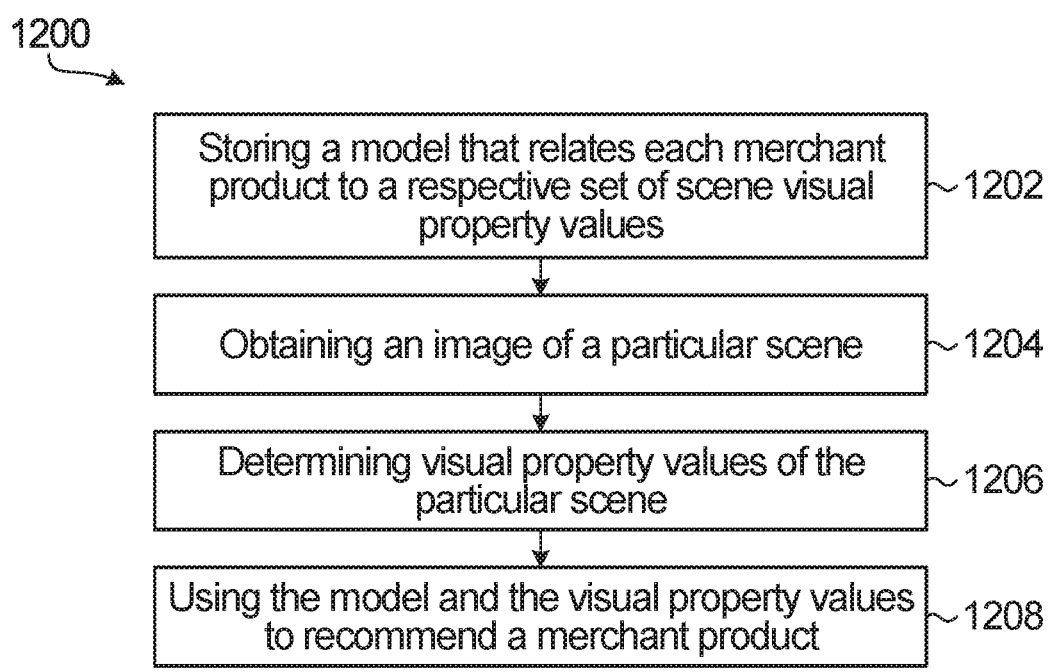
FIG. 12 is a computer-implemented method, according to one embodiment.

FIG. 12 is a flowchart of a computer-implemented method, according to one embodiment. The method may be performed by a computer system (e.g. a processor or combination of processors such as the processors 414 and/or 424). In some embodiments, the method may be implemented in an e-commerce platform (e.g. by the recommendation engine 300 or 410). In some embodiments, the method may be performed on the user device, e.g. if the user device downloads a software application that implements the method and that stores locally on the user device the model for recommending merchant products.

At step 1202, the system stores the model that relates each merchant product of a plurality of merchant products to a respective set of scene visual property values. For each merchant product: each visual property value of the respective set of scene visual property values is indicative of a visual property of a scene that includes the merchant product. This model may be generated within the system, or may be received by the system. Examples of such a model are shown in FIGS. 7 and 8. For example, in FIG. 7 the merchant product 'Vase', which is sold by the merchant having ID 0035, is associated with scene visual properties 708. The visual properties have visual property values, e.g. "4/10" for brightness, "yes" for scene includes candle sticks, etc. Each visual property value is indicative of a visual property of a scene that includes the merchant product. For example, the visual property value "4/10" for brightness is indicative of the visual property of "brightness". This indicates that scenes associated with the 'Vase' are not particularly bright. In some embodiments, the visual property values may be determined through the training phase of a machine learning algorithm.

At step 1204, the system obtains a digital image of a particular scene. The particular scene is captured by a user device, e.g. user device 460 or 902. For example, the particular scene may be captured by a digital camera of the user device taking a digital photograph of the particular scene. The user would like to have one or more products recommended for the particular scene. In some embodiments, the image can be transmitted by the user device over a network to the system for analysis so that a product recommendation can be made and returned to the user device.

At step 1206, particular visual property values of the particular scene are determined. In some embodiments, particular visual property values are determined by measuring, in the digital image of the particular scene, a visual property value corresponding to each of one or more visual properties in the model. For example, the model shown in FIG. 7 includes "presence of red in scene", and so the amount of red in the particular scene may be determined, e.g. by traversing each pixel in the image of the particular scene and determining how much red is in each pixel and summing the total component of red over all pixels in the image of the particular scene. The total component of red is a particular visual property value of the particular scene and can be compared to the percentage of red associated with different merchant products in the table of FIG. 7. In some embodiments, in actual implementation a trained machine learning algorithm may be implemented and include extracting the particular visual property values of the particular scene.

At step 1208, a recommendation for a merchant product is generated using the model and the particular visual property values determined in step 1206. This recommended product may then be communicated to the user device. According to some embodiments, the user is presented with an image (e.g. 2D image or 3D model) of the recommended product (e.g. superimposed on the image captured on the user's device), and possibly a website link for a webpage associated with the recommended product.

In some embodiments, generating the recommended merchant product may be performed by the system by selecting the recommended merchant product as one of the plurality of merchant products that has scene visual property values closest to the particular visual property values. For example, if the particular visual property values determined from the digital image of the particular scene captured by the user device include "{brightness of scene=4/10; contrast in scene=5/10; presence of red in scene=7/10; scene is of a dining room}", then the closest associated merchant product in the model table in FIG. 7 is 'Vase'. In implementation, the model may be implemented by a trained machine learning algorithm, and the recommended merchant product may be generated by executing the trained machine learning algorithm using the particular visual property values. As one example, the particular scene captured by the user device may be categorized as a particular scene type by the trained machine learning algorithm (using the particular visual property values), and that scene type was determined from the training phase to be associated with a particular merchant product, which is selected as the recommended merchant product.

In some embodiments, the model is generated by receiving a plurality of images of scenes, at least some of the scenes including one or more of the plurality of merchant products. Then, a machine learning algorithm is trained on the plurality of images to obtain, for each merchant product of one or more of the plurality of merchant products: at least some of the respective set of scene visual property values that correspond to the merchant product. For example, the supervised or unsupervised training methods described earlier may be implemented. In some embodiments, a merchant image that includes a particular merchant product may be received from a merchant device, and the merchant image may be used to determine at least some of the respective set of scene visual property values that correspond to the particular merchant product. For example, the merchant image may be analyzed to determine visual property values (brightness, etc.) and/or the merchant image may be used to train a machine learning algorithm that associates the merchant product with one or more scene visual property values, e.g. by categorizing the merchant image as a particular scene type that has one or more scene visual property values.

In some embodiments, one or more images from a social media platform may be used to assist in training the model. For example, the system may request a plurality of images from a social media platform, e.g. from a server of a social media platform. The system may associate a particular image of the plurality of images with a corresponding merchant product of the plurality of merchant products. The system may determine a scene visual property of the particular image, and the system may modify a scene visual property value associated with the corresponding merchant product based on the scene visual property of the particular image. One example is described earlier in the description in which the 'contrast' scene visual property value associated with a merchant's vase is adjusted based on an image of a scene including a vase from a social media platform.

In some embodiments, the user device is instructed to display a digital image (e.g. 2D image or 3D model) of the recommended merchant product on a display of the user device (e.g. like in FIG. 10). The user device may be instructed by the system transmitting, to the user device, a computer-executable instruction that, when executed by the processor of the user device, causes the user device to display the merchant product on the display of the user device. The instruction may include an image file (e.g. 2D image or 3D model) for the merchant product, which may be used by the user device to display the merchant product on the user device. In some embodiments, the instruction is for the user device to superimpose the digital image of the recommended merchant product on the digital image of the scene being displayed on the user device, e.g. on the particular scene. In some embodiments, a website link may be transmitted to the user device. The website link is for a website associated with the recommended merchant product.

In some embodiments, the system receives an indication that the user device has visited the website associated with the recommended merchant product. For example, an input may be received at the user interface of the user device indicating that the user selects the website link for the website associated with the recommended merchant product. Upon receiving this input, not only is the website retrieved by a browser of the user device, but a message is also transmitted from the user device to the system that generated the recommendation. In some embodiments, the system may then update the model based on the message. For example, as described earlier, the user selecting the website link for the recommended merchant product may act as a form of validation of the association between the recommended merchant product and the set of scene visual property values associated with the recommended merchant product. This may increase the probability that the recommended merchant product is also recommended to other user-uploaded scenes having similar scene visual properties.

In some embodiments, the system that is configured to perform the methods described above may include a memory (e.g. to store the model) and at least one processor (e.g. to perform the operations of the method).

Conclusion

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
   storing a model that relates each merchant product of a plurality of merchant products to a respective set of scene visual property values, wherein for each merchant product: each scene visual property value of the respective set of scene visual property values is indicative of a visual property of a scene that includes the merchant product;
   obtaining a digital image of a particular scene, the digital image having been captured by a user device;
   determining particular visual property values of the particular scene;
   generating, using the model and the particular visual property values, a recommended merchant product.

2. The computer-implemented method of claim 1, wherein the recommended merchant product is generated by selecting the recommended merchant product as one of the plurality of merchant products that has scene visual property values closest to the particular visual property values.

3. The computer-implemented method of claim 1, wherein the model is implemented by a trained machine learning algorithm, and wherein the recommended merchant product is generated by executing the trained machine learning algorithm using the particular visual property values.

4. The computer-implemented method of claim 3, further comprising generating the model by performing operations including:
   receiving a plurality of images of scenes, at least some of the scenes including one or more of the plurality of merchant products; and
   training the machine learning algorithm on the plurality of images to obtain, for each merchant product of one or more of the plurality of merchant products: at least some of the respective set of scene visual property values that correspond to the merchant product.

5. The computer-implemented method of claim 4, comprising:
   receiving, from a merchant device, a merchant image that includes a particular merchant product;
   determining, using the merchant image, at least some of the respective set of scene visual property values that correspond to the particular merchant product.

6. The computer-implemented method of claim 5, further comprising:
   requesting a plurality of images from a social media platform;
   associating a particular image of the plurality of images with a corresponding merchant product of the plurality of merchant products;
   determining a scene visual property of the particular image;
   modifying a scene visual property value associated with the corresponding merchant product based on the scene visual property of the particular image.

7. The computer-implemented method of claim 1, further comprising instructing the user device to display a digital image of the recommended merchant product on a display of the user device.

8. The computer-implemented method of claim 7, comprising instructing the user device to superimpose the digital image of the recommended merchant product on the digital image of the particular scene.

9. The computer-implemented method of claim 7, further comprising transmitting to the user device a website link for a website associated with the recommended merchant product.

10. The computer-implemented method of claim 9, further comprising receiving an indication that the user device visited the website associated with the recommended merchant product, and updating the model based on the indication.

11. A system comprising:
    a memory to store a model that relates each merchant product of a plurality of merchant products to a respective set of scene visual property values, wherein for each merchant product: each scene visual property value of the respective set of scene visual property values is indicative of a visual property of a scene that includes the merchant product;

at least one processor to:
obtain a digital image of a particular scene, the digital image having been captured by a user device;
determine particular visual property values of the particular scene; and
generate, using the model and the particular visual property values, a recommended merchant product.

12. The system of claim 11, wherein the at least one processor is to generate the recommended merchant product by selecting the recommended merchant product as one of the plurality of merchant products that has scene visual property values closest to the particular visual property values.

13. The system of claim 11, wherein the model is implemented by a trained machine learning algorithm, and wherein the at least one processor is to generate the recommended merchant product by executing the trained machine learning algorithm using the particular visual property values.

14. The system of claim 13, wherein the at least one processor is to generate the model by performing operations including:
receiving a plurality of images of scenes, at least some of the scenes including one or more of the plurality of merchant products; and
training the machine learning algorithm on the plurality of images to obtain, for each merchant product of one or more of the plurality of merchant products: at least some of the respective set of scene visual property values that correspond to the merchant product.

15. The system of claim 14, wherein the at least one processor is to:
receive, from a merchant device, a merchant image that includes a particular merchant product;
determine, using the merchant image, at least some of the respective set of scene visual property values that correspond to the particular merchant product.

16. The system of claim 15, wherein the at least one processor is further to:
request a plurality of images from a social media platform;
associate a particular image of the plurality of images with a corresponding merchant product of the plurality of merchant products;
determine a scene visual property of the particular image; and
modify a scene visual property value associated with the corresponding merchant product based on the scene visual property of the particular image.

17. The system of claim 11, wherein the at least one processor is further to: instruct the user device to display a digital image of the recommended merchant product on a display of the user device.

18. The system of claim 17, wherein the at least one processor is to instruct the user device to superimpose the digital image of the recommended merchant product on the digital image of the particular scene.

19. The system of claim 17, wherein the at least one processor is to: instruct that a website link for a website associated with the recommended merchant product is transmitted to the user device.

20. The system of claim 19, wherein the at least one processor is to receive an indication that the user device visited the website associated with the recommended merchant product, and update the model based on the indication.

* * * * *